United States Patent [19]
Matsumura et al.

[11] 3,942,939
[45] Mar. 9, 1976

[54] FLAT FLAME BURNER

[75] Inventors: Yuji Matsumura; Hiroyuki Mitsudomi, both of Nishinomiya, Japan

[73] Assignee: Osaka Gas Kabushiki Kaisha, Osaka, Japan

[22] Filed: Mar. 26, 1973

[21] Appl. No.: 344,891

Related U.S. Application Data

[63] Continuation-in-part of Ser. No. 139,709, May 3, 1971, abandoned.

[30] Foreign Application Priority Data

| May 6, 1970 | Japan | 45-44377[U] |
| May 9, 1970 | Japan | 45-45101[U] |
| Oct. 30, 1970 | Japan | 45-108339[U] |

[52] U.S. Cl. ............... 431/215; 431/173; 431/341; 431/353
[51] Int. Cl.² ......................................... F23D 11/44
[58] Field of Search ....... 431/8, 173, 341, 353, 215, 431/161; 110/28 F

[56] References Cited
UNITED STATES PATENTS

| 2,769,411 | 11/1956 | Simmons | 431/173 X |
| 2,777,407 | 1/1957 | Schindler | 431/173 X |
| 3,200,870 | 8/1965 | Hanley et al. | 431/173 |

*Primary Examiner*—Edward G. Favors
*Attorney, Agent, or Firm*—Edwin E. Greigg

[57] ABSTRACT

A flat flame burner comprises an air swirling chamber, an air supply tube provided for the air chamber for introducing combustion air thereinto in the peripheral direction of the air chamber so as to produce a swirling air stream in the chamber, a fuel gas supply tube disposed in the air chamber and having inlets centrally of the space for the swirling air stream and a flame opening positioned at one side in the direction of axis of the swirling air stream coaxially with the swirling air stream, the flame opening being defined by a wall having a thin portion around said opening and a flat outer face.

20 Claims, 13 Drawing Figures

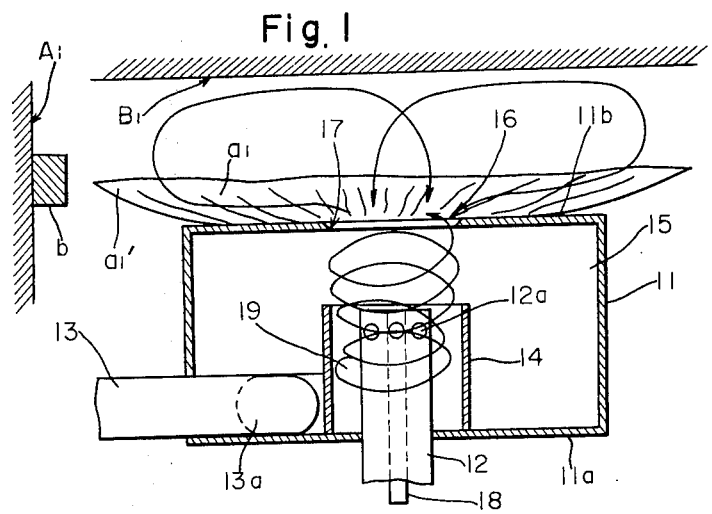
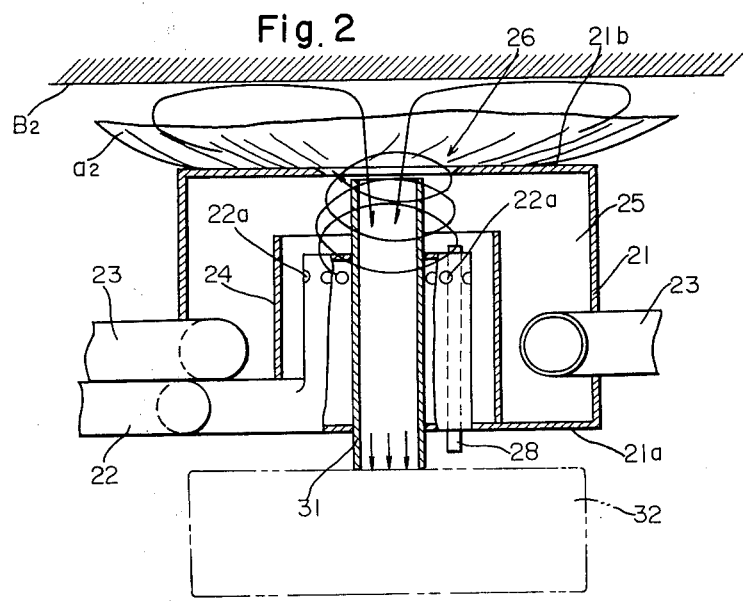
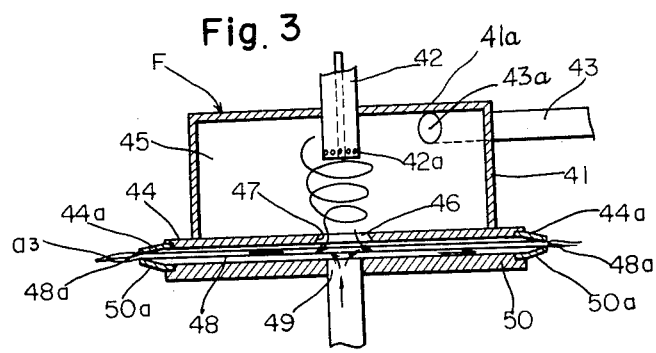

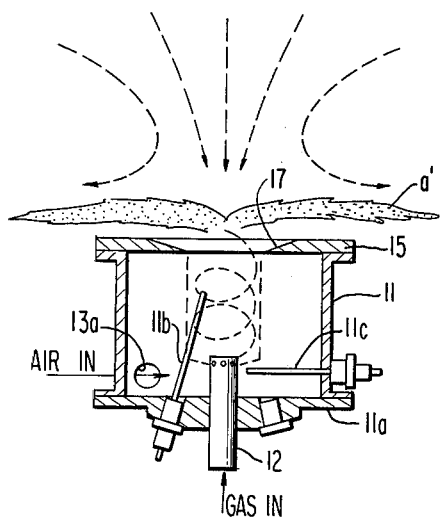
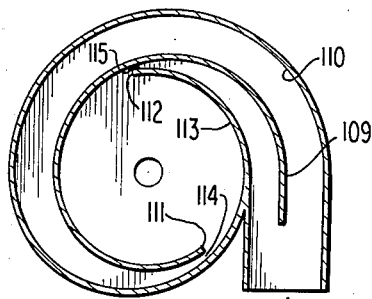
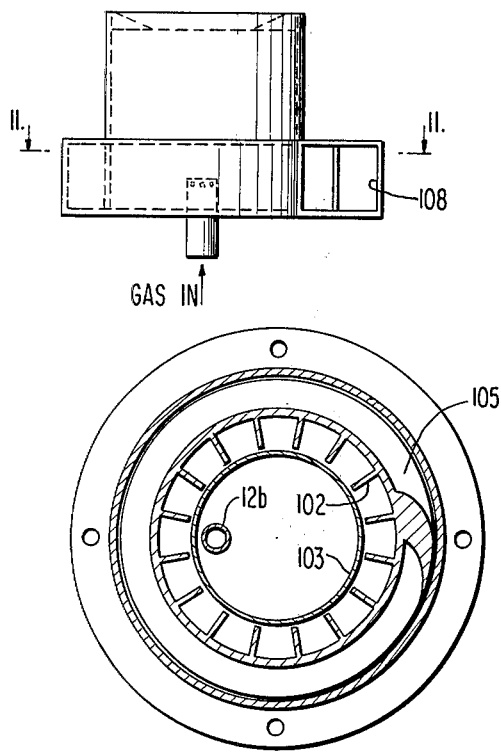
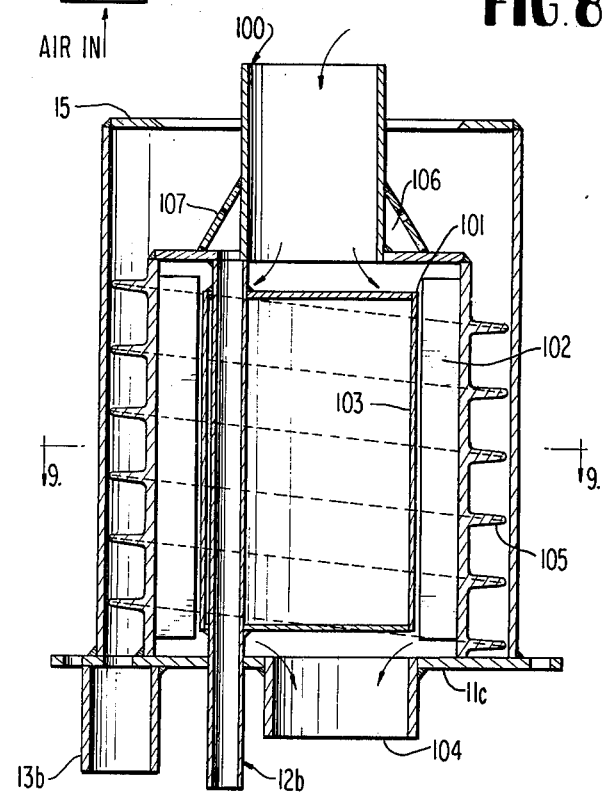
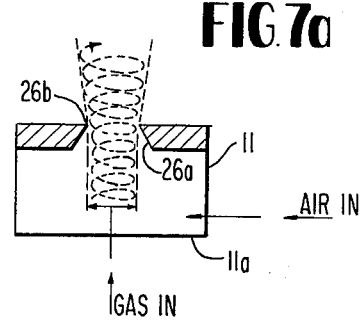
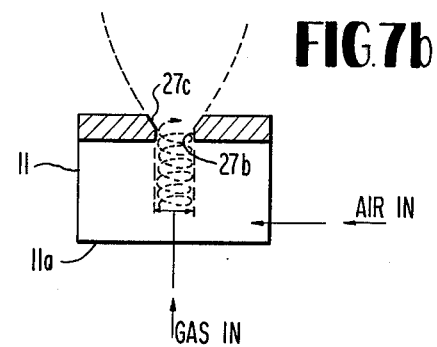

FLAT FLAME BURNER

This application is a Continuation-in-Part application of Ser. No. 139,709, filed May 3, 1971, now abandoned.

BACKGROUND OF THE INVENTION

Burners heretofore used for producing a flat flame over a wide area include a relatively elongated flaring section extending from the mixing chamber to the combustion chamber so as to permit thoroughly mixed fuel and air to flow into the combustion chamber and spread out in radial directions. With such structure, the flame may spread out radially to some extent, but because of provision of the elongated flaring opening, the axial component of jet velocity exerts influence on the flame to result in increase in the overall thickness of the flame in the axial direction of the egressed flame. Thus, the burner of the above-mentioned type fails to provide a flat flame.

Furthermore, the burner which includes a flaring section such as above, requires an elongated construction and the necessity to employ a refractory structure made of bricks or the like adds to the thickness of the constituent wall portions at the sacrifice of effective work space and renders the overall structure heavier.

SUMMARY OF THE INVENTION

The present invention relates to flat flame burners capable of producing a flame spread out radially over a wide area relative to its small thickness.

The flat flame burner in accordance with the present invention comprises a housing having an interior serving as an air swirling chamber. The wall of the housing at one side thereof in the direction of axis of the swirling air stream is formed with a flame opening which is disposed at the position corresponding to the axis of the swirling air stream. The wall defining the flame opening has a small thickness around said opening and a flat outer face. Accordingly, the characteristic of this construction that the combustion gas is forced out from the flame opening in a spiral direction by the swirling air current within the air chamber and the orifice effect of permitting the flame to emanate from a small opening to an unconfined outer space assure formation of a flat flame spreading out over a very wide area, thereby ensuring very rapid, uniform and highly efficient heat treatment of an article to be heated. With the present invention, moreover, it is possible to materially reduce the thickness of the overall device. The supply of combustion air in the form of a swirling stream makes it possible to provide a high velocity combustion burner without using a high pressure fuel gas, with the consequent advantage of satisfactory mixture of the fuel gas and combustion air and therefore markedly reduced combustion noise.

An object of the present invention is to provide a flat flame burner which is inexpensive and very compact in overall construction and yet which is capable of producing a flat flame spreading out over a wide area with high reliability and great ease.

Another object of this invention is to provide a flat flame burner including an exhaust cylinder opened respectively at one end proximate to a flame opening of a housing and at the other end positioned externally of the housing at one side thereof opposite the flame opening in the direction of axis of a swirling stream, the arrangement being such that the exhaust gas of the flat flame is moved toward the flame opening in circulation and flowed out through the exhaust cylinder so as to always enable a high temperature combustion gas to easily come into contact with the surface to be treated.

Another object of the present invention is to provide a flat flame burner which comprises two flat flame burners in combination, with the flame openings thereof disposed in face-to-face relation to define a narrow space therebetween, or which comprises a flat flame burner and a refractory plate disposed in facing relation to the burner with a narrow space formed therebetween, so as to enable a very thin flat flame to egress, outwardly and radially of the housing, from the passage provided by the narrow space and to perform heat treatment with its sharp flame edge.

Still another object of the present invention is to provide a flat flame burner which is capable of producing a very thin disc-like flat flame which spreads out radially of the housing as above-mentioned and which can be used for continuously heat-treating articles which are moved along the outer periphery of the disc-like flat flame.

BRIEF DESCRIPTION OF THE DRAWINGS

FIG. 1 is a view in vertical section showing a flat flame burner in accordance with this invention;

FIG. 1a is a view in vertical section showing a further embodiment of the structure shown in FIG. 1;

FIGS. 2 to 4 are views in vertical section showing other embodiments;

FIG. 7a is a schematic sectional view of a burner disclosing another embodiment of a top plate for control of the flame emitted;

FIG. 7b is a schematic sectional view of a burner disclosing still another embodiment of a top plate for control of the flame emitted;

FIG. 8 is a generally cross-sectional view in vertical elevation showing a further embodiment of a burner provided with a flue;

FIG. 9 is a sectioinal view on line 9—9 of FIG. 8;

FIG. 10 is an elevational view of another embodiment of a burner showing the air entrance cavity within the general interior configuration of the burner shown in dotted outline; and FIG. 11 is a sectional view on line 11—11 of FIG. 10.

DESCRIPTION OF THE PREFERRED EMBODIMENTS

Figure 4:
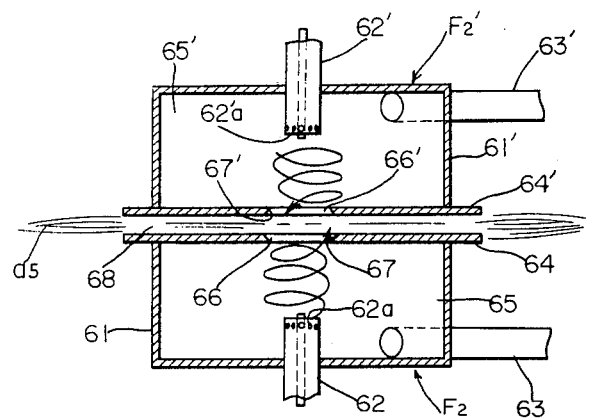

Turning now to the drawings, the modes of embodying the present invention will be described in detail.

In FIG. 1 there is shown a cylindrical housing 11 made of metal, ceramic or other refractory material and provided, proximate to its bottom 11a, with an air supply tube 13 having an opening 13a for supplying combustion air into the housing 11 tangentially of the periphery thereof. The interior of the housing 11 serves as an air swirling chamber 15. Fixed to the housing 11 at the position corresponding to the center of the space for swirling air in the chamber 15 is a gaseous fuel supply tube 12 extending through the bottom 11a. The peripheral wall of the gaseous supply tube 12 adjacent to its closed end is formed with gas inlets 12a for injecting the gaseous fuel into the air swirling chamber 15 in a radial direction or in a swirling manner. At an upper position in the direction of axis of the swirling movement of the air in the chamber 15, there is disposed the top wall 11b of the housing 11. The top wall 11b is formed, at the position corresponding to the axis of the swirling movement, with means defining a flame opening 16 which is small relative to the area of the top wall 11b. The top wall 11b is made of relatively thin material and includes a flat outer surface. The air chamber 15 includes a cylinder 14 surrounding the gas inlets 12a and fixed to the bottom 11a of the housing 11, the cylinder 14 being outwardly spaced from the gas inlets 12a a suitable distance 19. Indicated at 18 is a flame detecting rod.

The air is supplied into the chamber 15 through the air supply tube 13 and a gaseous fuel is introduced into the chamber 15 from the gaseous supply tube 12 through the inlets 12a in a radial direction or in a swirling manner. Due to the provision of the surrounding concentric collar or cylinder 14, the air forced in from the opening 13a of the air supply tube 13 is formed into a vigorous spiral swirling air stream, while the cylinder 14 defines the space 19 for stagnating the fuel gas at the center of the swirling stream around its axis after the fuel gas has been injected into the chamber 15. At this time, adverse effects to be otherwise exerted by the force of supplied air and that of the injected fuel gas upon each other are controlled and occurrence of turbulence in the swirling air stream as well as in the fuel gas is prevented. In fact, the fuel gas is forced into the swirling air stream to achieve a very satisfactory mixture of both the gaseous fuel and the air.

Thus, both gaseous fuel and air flow upward in swirling movement while partially being initiated into combustion to form a cylinder of swirling flames. Since the depth of the flame opening 16 in the axial direction of the swirling stream is small, with the interior of the chamber communicating with an unconfined outer space through the flame opening 16, the combustion gas, upon egression from the opening 16, spreads laterally outwardly of the top wall 11b in the form of a spiral swirling stream. The fact that combustion gas having a high temperature spreads out radially while expanding rapidly in its volume results in the formation of a thin flame $a_1$ over a wide area on the outside of the top wall 11b near the flame opening 16. Between the flame $a_1$ and the top wall 11b, at this time, a layer of air which did not take part in combustion is formed to prevent the top wall 11b from overheating by the flame $a_1$.

The flame opening 16 which flares outward as indicated at 17 in FIG. 1 serves to increase the component of velocity in a direction perpendicular to the axial direction. This most desirable in producing a flat flame.

The surrounding cylinder 14 can be dispensed with in forming a flat flame without resulting in particular objections.

When an article to be heat-treated $b$ is placed on a plane $A_1$ as shown in FIG. 1, the article $b$ is subjected to rapid heat treatment by the flame edge $a'$ at a local portion in its one surface. In the case where an article to be heat-treated is placed on a plane $B_1$, the article will be heated rapidly with the exhaust gas of the flame $a_1$ circulating between the opening 16 and the plane $B_1$ as indicated by an arrow as well as with radiant heat, uniform heating thus being achieved without direct contact of the flame $a_1$ with the plane $B_1$ which would cause spot heating.

Since the chamber 15 is so designed as to form a cylinder of swirling flames at its center, the housing per se need not be of a refractory construction made of bricks or the like but it may be built of a metal material in compact form having a small diameter. The swirling stream ensures a satisfactory mixture and serves to materially reduce combustion noise.

In FIG. 1a is shown an embodiment of the flat flame burner illustrated in FIG. 1 which further also includes in addition to the features described earlier a flame rod 11b which functions as an electrode and an ignition plug 11c.

As well shown in this view a flame column is formed around the burner axis and between this flame column and the inside wall of the burner is provided a swirling air layer. This mixture of air and gas which swirls along the length of the body 11 of the burner, is suddenly throttled at the burner top by the plate 15. As a result, the velocity in the axial direction is suppressed and the swirling effect of the gas and air is further intensified. Upon leaving the burner body through the axially disposed opening 17, the mixture is thus spread radially over the top of the plate 15 and the flame is then flat and planar.

The air required to support combustion as previously described in connection with the earlier views in this application is introduced tangentially through 13a so that the flame as a whole is constantly rotating at a very high speed, thus creating a negative pressure between the burner and the exit port 17 in the plate 15 thereby inducing air currents in the manner shown by the dotted arrows.

It is believed that it will be understood by those skilled in this art that a furnace of this design has particular utility in providing for uniform distribution of temperature.

Due to the negative pressure which exists within the flame column in the burner body, the injection of fuel gas is evenly promoted and thereby helps maintain the flame. This formation of a columnar flame is one of the salient features of this burner construction. Thus, due to the stable flame that is formed, any resultant noise is considerably less than ordinarily produced by a burner and also since the flame itself is not in contact with the burner walls, but only with the swirling air, the walls are then kept cool. Accordingly, it is conceivable that burners of this type, not being subjected to excessive temperatures, can be made from ordinary inexpensive castings and still have sufficient durability and long life.

In FIG. 2 an exhaust cylinder 31 is aligned with the axis of swirling movement of the air in an air swirling chamber 25 and has one end opened at a position close to a flame opening 26 formed in the top wall 21b of a housing 21. The exhaust cylinder 31 has the other open end opposite to the flame opening 26 and extending outwardly of the bottom 21a of the housing 21. The cylinder 31 further extends through a gas supply tube 22 coaxially therewith and is fixed in position. Communicating with the lower end of the exhaust cylinder 31 is a heat exchanger 32. Gas inlets 22a are formed at the peripheral wall proximate to the closed distal end of the gas supply tube 22. Indicated at 23 are air supply tubes for supplying air to be swirled for combustion; at 24, a surrounding cylinder; and at 28, a flame detecting rod.

As already described with reference to FIG. 1, the combustion gas flowing in the direction of the arrows in FIG. 2 is discharged from the exhaust cylinder 31. The discharge from the cylinder 31 of the combustion gas which has been deprived of heat by effecting heating operation ensures positive outflow of the gas which has been cooled and tends to stay under a plane $B_2$ in contact therewith, allowing the following hot combustion gas to come into contact with the plane $B_2$ with greater ease and to impart its heat directly to the plane $B_2$ or to an article thereon more effectively. Through repetition of this phenomenon the plane $B_2$ or the article thereon can be heated for treatment efficiently and uniformly.

In the case where the surface to be treated is spaced from the flame opening 26 of the housing 21 by a smaller distance to provide more effective work space, the present device can be used with greater advantage.

It will be seen that with the burner of this invention, the exhaust gas of a relatively high temperature discharged from the exhaust cylinder 31 serves to preheat the combustion air and fuel gas flowing through the chamber 25, and the exhaust gas may be fed into the heat exchanger 32 to preheat the air and gaseous fuel for heat recovery. The burner thus has a great advantage of improved combustion efficiency to achieve highly efficient heat treatment in its entirety.

The closer the upper opening of the exhaust cylinder 31 to the flame opening 26, the better will be the result attained. The best result will be obtained with a cylinder, the upper opening of which projects slightly above the flame opening 26.

FIG. 3 shows a cylindrical housing 41 made of metal, ceramic or like material and is provided, proximate to its bottom 41a, with an air supply tube 43 having an opening 43a for supplying combustion air into the housing 41 tangentially of the periphery thereof. The interior of the housing 41 serves as an air swirling chamber 45. Fixed to the housing 41 centrally of the space for swirling air in the chamber 45 is a gaseous fuel supply tube 42 extending through the bottom 41a. The peripheral wall of the gas supply tube 42 proximate to its closed end is formed with gas inlets 42a for injecting a gaseous fuel into the air swirling chamber 45 in a radial direction or in a swirling manner. At one side in the direction of axis of the swirling movement of air in the chamber 45, there is disposed a thin plate 44 formed, at the position corresponding to the axis of the swirling movement, with a flame opening 46 which is small relative to the area of the thin plate 44. The thin plate 44 has a small thickness and a flat outer face. The flame opening 46 flares outwardly as indicated at 47.

Disposed in facing relation to the thin plate 44 of a flat flame burner F thus constructed is a refractory plate 50, the plates 44 and 50 being spaced apart by a small distance. The refractory plate 50 is formed, in a portion thereof opposite the flame opening 46, with an air inlet 49. Annular plates 44a and 50a defining a flame jet 48a are provided around the outer peripheries of the thin plate 44 and refractory plate 50, respectively.

The refractory plate 50 confines a flat flame emanating from the flame opening 46 of the flat flame burner F and promotes radially spreading out of the flame $a_3$, with the result that a sharp-edged flame $a_3$ is obtained. In addition, the jet of the flat flame $a_3$ causes fresh air to flow from the outside into the air chamber 45 by way of the air inlet 49 and thereby assures swirling movement of the air within the chamber 45 to maintain stable combustion all the time. Consequently, the desired heating efficiency will be ensured for a continuous operation over a prolonged period to achieve improved working efficiency.

In FIG. 4 the air supply tubes 63, 63' supply combustion air into air swirling chambers 65, 65' in a spiral swirling manner. The gaseous fuel supply tubes 62, 62' extend from the bottom of the air chambers 65, 65' coaxially therewith. The peripheral walls of the gas supply tubes 62, 62' are formed, proximate to their closed distal ends, with gaseous fuel inlets 62a, 62a'. Thin plates 64, 64' are fixed to the ends of housings 61, 61', each at one side in the axial direction of swirling movement of air in each of the air chambers 65, 65'. These may be made of a metal or ceramic material. Flame openings 66, 66' are formed in the thin plates 64, 64' coaxially with the swirling air stream. The flame openings flare outwardly.

Two flat flame burners $F_2$, $F_2'$ thus constructed are disposed in opposite relation, with their flame openings 66, 66' facing each other. A small space is formed between the thin plates 64, 64' to define a passage 68 for a flat flame.

With the flat flame burner shown in FIG. 4, cylinders of flames in stable swirling movement are produced in the air chambers 65, 65' in the same manner as already described. The energy of the swirling movement further acts to form flat flames which spread out radially respectively at positions close to the flame openings 66, 66' externally thereof. The flat flames emanating from the respective burners $F_2$, $F_2'$ in face-to-face relation are joined with each other in the passage 68 so as to form a thin flame $a_5$ which continuously extends along the peripheries of the burners.

Since two flat flames strike each other and are joined into the flame $a_5$ is forced out from the narrow passage 68 radially thereof, it is possible to jet a flat flame with improved sharpness and at a high velocity. Furthermore, the use of two burners $F_2$, $F_2'$ remarkably facilitates temperature control to eliminate waste of gaseous fuel. Layers of air produced on the surfaces of the thin plates 64, 64' of the burners $F_2$, $F_2'$ protect the thin plates 64, 64' from overheating. As a result, heat treatment can be conducted with high efficiency with a flame of high temperature and high velocity.

The flat flames to be produced by the embodiments of FIGS. 3 and 4 may of course be formed continuously or discontinuously over the entire periphery of the thin plate of the housing.

Figure 5:
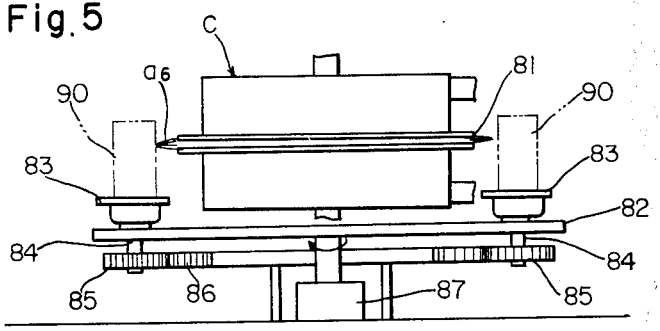
FIG. 5 is a side elevation showing the burner of this invention as it is used for continuous heat treatment.
Figure 6:
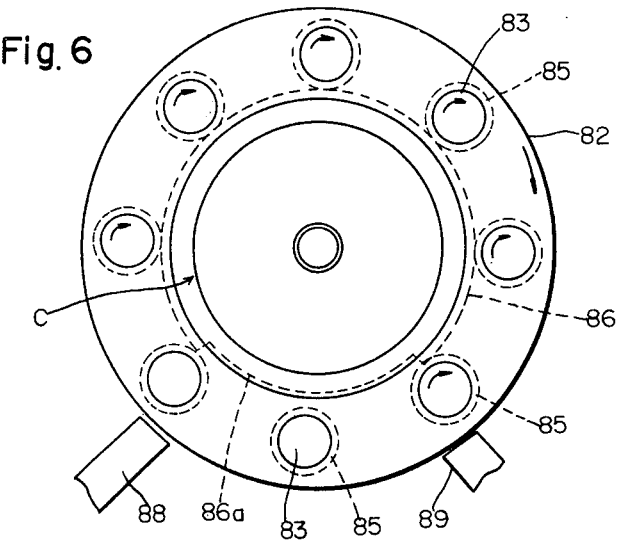
FIG. 6 is a plan view of FIG. 5.

An embodiment of an apparatus for heat treatment incorporating the burner of this invention will now be described with reference to FIGS. 5 and 6.

This apparatus employs, for instance, a burner C comprising flat flame burners $F_2$, $F_2'$ as shown in FIG. 4 which are disposed in face-to-face relation. The burner C in the form of a disc is positioned substantially horizontally and a turntable 82 is disposed under the burner C coaxially therewith. Rotatably supported on the turntable 82 along its periphery are article carriers 83 which are positioned outwardly of the flame jet 81 of the burner C, the article carriers being rotatably on their own axes and spaced apart from each other by a given distance along the periphery. Pinion gears 85 fixedly mounted on the lower ends of the drive shafts 84 of the carriers 83 are in meshing engagement with a disc-like rack 86 fixed in position, the rack being such that some of the teeth are removed as indicated at 86a. The turntable 82 is coupled to a motor 87. Mounted at suitable positions around the outer periphery of the turntable 82 corresponding to the toothless portion 86a of the rack 86 are supply means 88 and unloading means 89 for loading an article to be heat-treated onto, and unloading the same from the carrier 83 while it is not in rotation on its own axis.

The turntable 82 is driven by the motor 87, whereby the carriers 83 are rotated on their own axes by means of the pinion gears 85 and rack 86, the articles 90 on the carriers 83 thus being moved around the flame jet 81 while being moved on their own axes. On the other hand, a sharp flat flame $a_6$, the same as described with reference to FIG. 4, is emanated from the periphery of the jet 81 of the burner C in the form of a disc. Accordingly, the articles to be heated are continuously and uniformly heat-treated at their peripheral portions.

For heat-treating articles such as mouths of bottles in continuous operation, a number of burners of the cylindrical type, so-called Pian burners, have heretofore been used in alignment or in radial arrangement. However, the arrangement of such burners for heat treatment operation is extremely complex and requires great expense and much space and the control, such as temperature control, of a number of individual burners is difficult to achieve without ingenuity and skill. Conventional devices are therefore inefficient.

With the present apparatus comprising two flat flame burners in face-to-face relation, it is possible to provide a continuous or discontinuous flat flame along the periphery thereof, with the resulting advantage that it is suitable for continuous heat treatment for mouths of bottles or the like, free of the drawbacks conventionally experienced and capable of conducting continuous heat treatment with extreme ease.

The burner as shown in FIG. 3 can of course be used for continuous heating operation with ease.

The burner of this invention can obtain not only a flat flame but also a cylindrical flame may be made to project perpendicularly relative to the outside of the housing by quantities of the gas and the air supply for combustion and their pressures being adjusted relative to each other. Accordingly, in case of a heat treatment for a metal article, it may be possible for the burner to be utilized in the following manner. At first, the material to be treated is exposed to said cylindrical flame to be heated by a burner. After it reaches a desired temperature, it can thereafter be uniformly heated by a flat flame burner. And furthermore, a reverse operation is also possible to be practiced.

The drawings of FIGS. 7a and 7b are only schematically shown since the inventive concept is well disclosed in the earlier views in this application and these later views are only necessary to show the type of cover plates that are required for the burner 11 to provide generally cylindrical or toroidal flames.

In FIG. 7a the cover plate 15, it will be observed, is of somewhat greater thickness than that shown in the earlier views in this application and includes a flame opening 26a, the throat of which is constricted at the exterior surface of the plate as shown at 26b. The line 11 in this view as in FIG. 8 represents the wall of the burner and 11a the bottom thereof.

In the FIG. 7b view there is disclosed the type of opening in the top wall of the burner that will provide a toroidal flame. It will be noted from this view that the throat 27b is more constricted toward the inner surface of the plate than it is on the exterior surface, thereby providing between the interior and exterior walls of the cover plate a conical surface which widens toward the outer wall thereof and as indicated at 27c.

Thus, it is believed to be clear from the foregoing that by carefully controlling the thickness of the material from which the top plate is manufactured and the shape of the aperture therein, that is, whether on the one hand the throat area be lesser on the outside of the top plate and the angular divergence of the conical wall is less severe, a cylindrical flame will be formed, or on the other hand, if the throat area is lesser on the interior surface of the top wall and the angle of divergence of the conical wall is greater, then a flat flame that extends radially outward over the top of the burner will be created.

Further, as shown in FIG. 7b, by controlling the angle of divergence or conicity through the wall of the top plate, one can thereby completely control the type of flame emitted from the burner.

Referring now to FIGS. 8 and 9, there is disclosed in these views a further embodiment of the improved burner disclosed herein which includes a preheater for combustion air.

The burner 11 is provided with the usual top plate 15 as explained earlier herein, but as distinguished from the earlier burners disclosed, this type of burner includes a flue which is disposed along the negative pressure region. It is believed that it will be apparent to those skilled in the art that, as explained in connection with the structure of FIG. 1a, air will travel downwardly into the flue as shown by the dotted arrows in the view of FIG. 8 and be emitted at the bottom thereof as an exhaust. Thus, preheating of the combustion air is provided for by means of this flue.

Accordingly, negative air enters the mouth of the flue 100 and flows downwardly where it is diverted radially by the top surface of baffle 101 toward the perpendicularly extending straight fins 102 thereby heating the tubular wall 103. Ultimately the air that enters the mouth 100 is exhausted at 104.

Further, in this structure the air enters at 13b where it is swirled by the spiral fins 105 into contact with the heat exchanger wall 103. Simultaneously therewith the gas is introduced into pipe 12b and passes upwardly therethrough until it enters the chamber 106 which is provided with the beveled perforate wall 107. At this point the rising, swirling air intermixes with the gas and upon ignition is discharged as a flat flame as explained earlier herein.

This concept has therefore the advantages of making it unnecessary to provide heat insulation for combustion air piping as well as making it unnecessary to provide piping for a separate heat exchanger and this structure as well eliminates the usual flue. This type of burner is principally intended for furnace use and is designed to give its specified capacity at the equivalent of air inlet pressure approximating about 300 mm $H_2O$.

In FIG. 10 there is shown a type of burner which utilizes low pressure air which enters the mouth 108 and is soon thereafter divided into two flow streams by a baffle 109 with the outer burner wall 110 as well as the baffle being shaped to generally resemble the curvature of a snail shell. It will be noted from an examination of FIG. 11 that the terminus 111 of the baffle 109 is substantially diametric to the terminus 112 of the wall 113, this being so to avoid eccentricity of the swirling air stream so that the air flow is then divided into two routes. The sum of the areas of these two sub-inlets 114 and 115 is equal to that of the initial inlet 108.

Referring back again to the view in FIG. 10, it will then be well understood that with the air flowing in the manner indicated earlier and the gas being brought in through the bottom wall of the burner that the gas and air will mix as it is swirling along the length of the burner body 11 and will be suddenly throttled at the burner top by the plate 113 and thence discharged as a flat flame as explained fully hereinbefore in connection with the embodiments of this invention.

What is claimed is:

1. A burner comprising a housing provided with a planar exterior wall having a first perforation, means defining a second opening in the housing in axial alignment with said first perforation, gas conduit means having an inner terminal portion coaxial with the said second opening in the housing, said conduit further including plural outlets spaced from the terminus, and inlet means to introduce continuously swirling combustion air into said housing exteriorly of said gas inlet conduit wherein an inner peripheral wall defining said first perforation has an axial dimension smaller than a radial dimension in order to form a flat flame spreading outwardly over said planar exterior wall.

2. A burner as claimed in claim 1, wherein an exhaust cylinder is concentric with said terminal portion of said gas inlet.

3. A burner comprising a housing provided with a first perforated planar exterior wall, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit, flame control means embodied with the first perforate wall to form a flame having a predetermined characteristic, and an exhaust cylinder concentric with said terminal portion of said gas inlet.

4. A burner comprising a housing provided with a first perforated planar exterior wall, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit, flame control means embodied with the first perforate wall to form a flame having a predetermined characteristic and collar means disposed concentric with the terminal portion of said gas inlet conduit.

5. A burner comprising a housing provided with a first perforated planar exterior wall, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit, flame control means embodied with the first perforate wall to form a flame having a predetermined characteristic, and an axially apertured plate means disposed in spaced relation to said first perforated flat exterior wall of said housing.

6. A burner comprising a housing provided with a first perforated planar exterior wall including a throat area which diverges outwardly, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit and flame control means embodied with the first perforate wall to form a flame having a predetermined characteristic.

7. A burner comprising a housing provided with a first perforated planar exterior wall including a throat area which converges inwardly, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit and flame control means embodied with the first perforate wall to form a flame having a predetermined characteristic.

8. A burner comprising a housing provided with a first perforated planar exterior wall, means defining a second opening in the housing in axial alignment with the perforation in said wall, gas conduit means having an inner terminal portion coaxial with the said second opening in the housing, said conduit further including plural outlets spaced from the terminus, inlet means to introduce continuously swirling combustion air into said housing exteriorly of said gas inlet conduit and flame control means embodied with the first perforate wall to form a flame having a predetermined characteristic, wherein the combustion air inlet means includes curved baffle means serving to divide the incoming air into two separate streams.

9. A burner as claimed in claim 3, wherein the exhaust cylinder communicates with a heat exchanger.

10. A burner as claimed in claim 9, wherein the heat exchanger is concentrically disposed within the burner housing.

11. A burner as claimed in claim 1, wherein a collar means is disposed concentric with the terminal portion of said gas inlet conduit.

12. A burner as claimed in claim 3, wherein a collar means is concentric with said exhaust cylinder.

13. A burner as claimed in claim 1, wherein an axially apertured plate means is disposed in spaced relation to said first perforated flat exterior wall of said housing.

14. A burner as claimed in claim 5, wherein a supplemental air inlet means is associated with the axially apertured plate means.

15. A burner as claimed in claim 5, wherein the axially apertured plate means consists of a refractory material.

16. A burner as claimed in claim 5, wherein the axially apertured plate means forms one wall of a supplemental housing which further includes combustion air and gaseous fuel supply means.

17. A burner as claimed in claim 10, wherein the heat exchanger shrouds a baffle-type deflector means.

18. A burner as claimed in claim 1, wherein the first perforated planar exterior wall includes a throat area which diverges outwardly.

19. A burner as claimed in claim 1, wherein the first perforated planar exterior wall includes a throat area which converges inwardly.

20. A burner as claimed in claim 1, wherein the combustion air inlet means includes curved baffle means serving to divide the incoming air into two separate streams.

* * * * *